United States Patent [19]

La Crosse et al.

[11] Patent Number: 4,542,923

[45] Date of Patent: Sep. 24, 1985

[54] DUCT JOINTING SYSTEM

[76] Inventors: Frank X. La Crosse, 445 E. 42nd St., Hamilton, Ontario, Canada, L8T 3B2; Waldemar H. Greiner, 11 Harrisford St., Unit 55, Hamilton, Ontario, Canada, L8K 6L7

[21] Appl. No.: 558,963

[22] Filed: Dec. 7, 1983

[51] Int. Cl.[4] .................................. F16L 25/00
[52] U.S. Cl. .................................. 285/424; 285/364; 285/406; 285/414
[58] Field of Search ............... 285/363, 424, 405, 364, 285/365, 366, 367, 406, 407, 408, 409, 410, 411, 414

[56] References Cited

U.S. PATENT DOCUMENTS

| | | | |
|---|---|---|---|
| 3,712,650 | 1/1973 | Mez | 285/405 |
| 3,923,326 | 12/1975 | Mez | 285/363 |
| 4,218,079 | 8/1980 | Arnoldt | 285/363 X |
| 4,244,609 | 1/1981 | Smitka | 285/405 |
| 4,252,350 | 2/1981 | Smitka | 285/424 X |

FOREIGN PATENT DOCUMENTS 2434160  1/1976  Fed. Rep. of Germany ...... 285/424

*Primary Examiner*—Richard J. Scanlan, Jr.
*Attorney, Agent, or Firm*—Sim & McBurney

[57] ABSTRACT

A duct jointing system is provided which includes a plurality of elongate frame members, each being a single piece of sheet metal folded to define a particular section. The section includes an open channel to receive an edge portion of the sheet metal duct, the channel having a base, a first web extending generally perpendicularly to said channel from a location adjacent the base, an outer portion at the end of the first web remote from the channel, the outer portion extending in the same general direction as the channel, and a second web extending obliquely toward the channel from a location adjacent the remote end of the first web. The single piece of sheet metal has an expanded portion constituting substantially the whole of the second web. A plurality of corner pieces are provided, each having two ends angled to each other, each end being insertable endwise into one end of one of the elongate frame members, and means are provided for securing together adjacent frame members on opposing duct ends.

15 Claims, 10 Drawing Figures

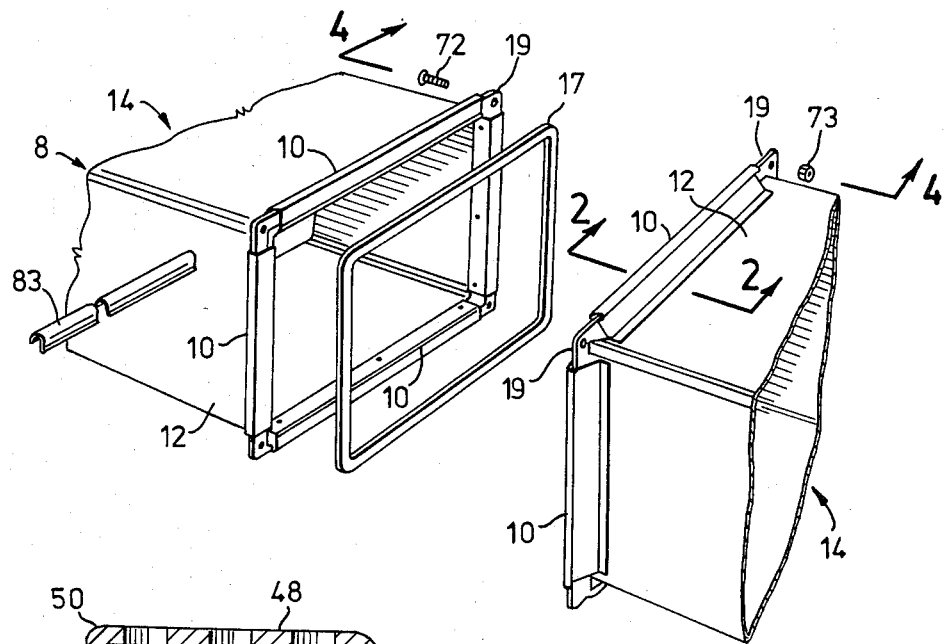
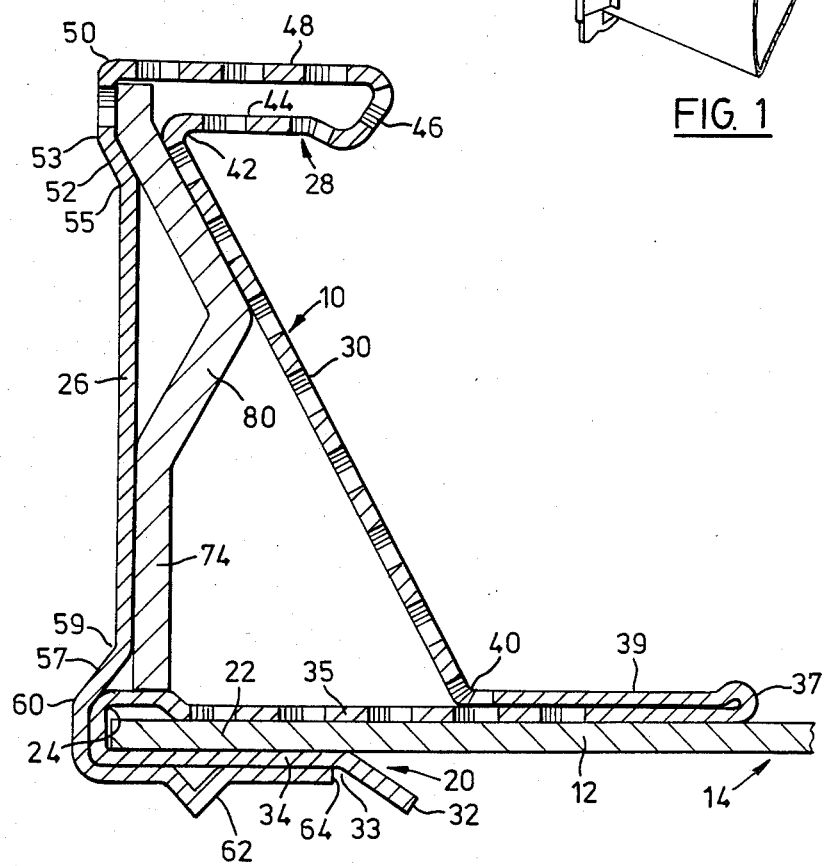
FIG. 1
FIG. 2

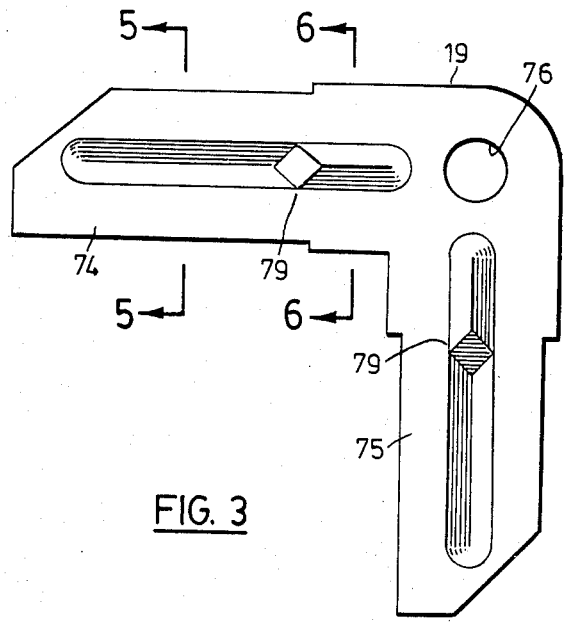
FIG. 3
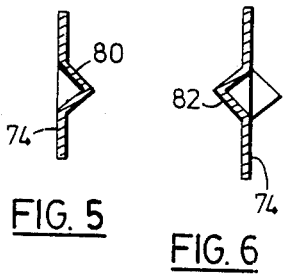
FIG. 5
FIG. 6
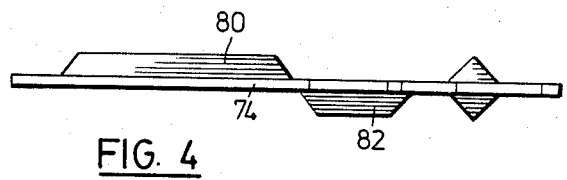
FIG. 4
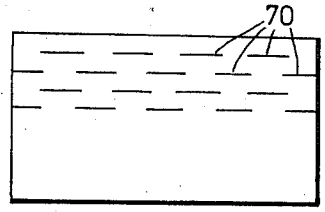
FIG. 7
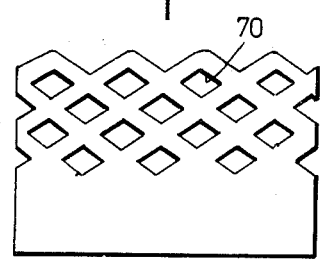
FIG. 8

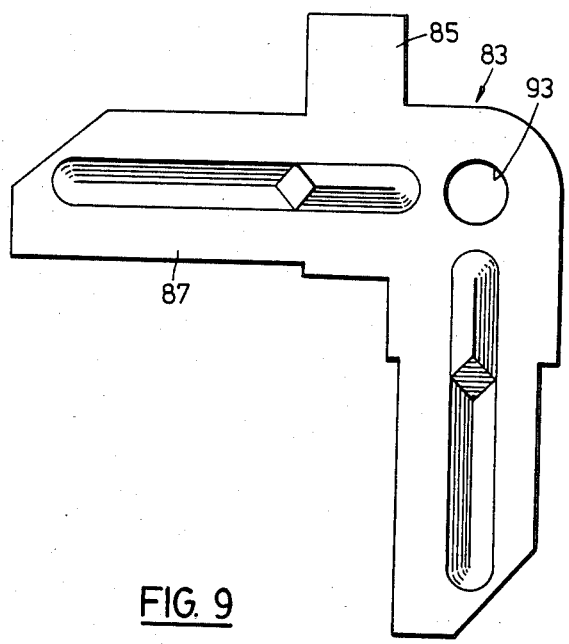
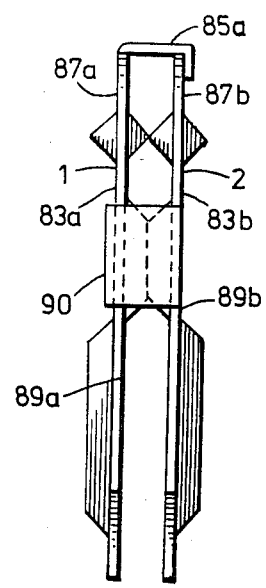
FIG. 9
FIG. 10

4,542,923

DUCT JOINTING SYSTEM

This invention relates generally to a duct jointing system for air conditioning, heating and/or ventilating ducts which are typically rectangular in section. More particularly, this invention pertains to a particular section or configuration for a frame member constituting a part of the duct jointing system, the frame member being adapted to receive an edge portion of one wall of the sheet metal duct. Even more particularly, this invention pertains to the use of a particularly treated material which is bent to define the section of the frame member, which treatment allows certain advantages to be had.

BACKGROUND OF THIS INVENTION

Duct jointing systems comprising a plurality of elongate frame members along with a similar number of corner pieces adapted to be received endwise into the frame members, are well known. Exemplary of the prior art in this area are the following patents:
U.S. Pat. No. 3,712,650, Mez, issued Jan. 23, 1973;
U.S. Pat. No. 4,252,350, Smitka, issued Feb. 24, 1981;
U.S. Pat. No. 4,218,079, Arnoldt, issued Aug. 19, 1980;
U.S. Pat. No. 3,923,326, Mez, issued Dec. 2, 1975;
U.S. Pat. No. 4,244,609, Smitka, issued Jan. 13, 1981;
DE OS No. 2434160, Pedall, filed July 16, 1974.

The prior art, as exemplified by the foregoing publications, generally discloses a duct jointing system which includes a plurality of elongate frame members, each frame member being a single piece of sheet metal folded to define a section including an open channel for receiving an edge portion of one wall of a sheet metal duct, a first web extending generally perpendicularly to the channel from a location adjacent the channel-space, an outer portion at the end of the first web remote from the channel, the outer portion extending in the same direction as the channel, and a second web extending obliquely towards the channel from the remote end of the first web. Also included in the known duct jointing system are clip means for clipping adjacent frame members together, and corner pieces with angled ends, each end being insertable endwise into one end of an elongate frame member. In particular, U.S. Pat. No. 4,252,350, Smitka, incorporates these features.

Despite all of the developments set forth in the patents identified above, there is continuing pressure in the industry to reduce the cost of the duct jointing system still further, and it is an aspect of the present invention to accomplish this.

One approach to reducing the cost of a duct jointing system of the kind described is to use the thinnest metal possible for the basic frame members which receive the end edges of the duct walls. However, there is a minimum thickness required for at least certain portions of the frame member, in order to ensure adequate strength. It must be appreciated that the frame members are called upon not merely to hold the open ends of adjacent duct portions in juxtaposition. In many installations, the ducts are called upon to carry air or gas which is substantially above the ambient pressure, and this tends to "bow out" the end edges of the duct walls. The frame members of the duct jointing system must of course withstand this tendency to warp outwardly, which increases with increasing internal pressure. Under standard building codes, there are maximum joint deflection requirements. The joint must be strong enough not to exceed these maximums, and therefore the metal must be of a certain minimum gauge.

We have discovered, however, that only certain portions of the section of the frame member require this minimum thickness of sheet metal, because these portions are either in compression, or are bent or folded in such a way that the fold constitutes a weakened location requiring the additional strength of the minimum sheet metal thickness. Other portions of the section, however, are purely in tension, and especially where these portions are straight in section, it would be possible to utilize a thinner sheet metal material.

Naturally, it is impractical to try to provide a sheet metal blank which has different thicknesses corresponding to these different requirements, since the expense of differential rolling would more than offset any saving in material.

It is therefore another aspect of this invention to provide a frame member for a duct jointing system which has the minimum thickness required for areas which either are under compression or support complicated folds, while allowing a lesser amount of material in the areas which are under pure tension, without requiring differential rolling of the sheet metal blank.

GENERAL DESCRIPTION OF THIS INVENTION

Essentially, the aspects of this invention are realized by forming the frame member of the duct jointing system from a piece of uniform-thickness sheet metal which has been slit and expanded along certain portions corresponding to the portions of the frame member which are in tension. The process by which the sheet metal is slit and expanded is relatively inexpensive, and does not negate the saving of material which can be obtained by this approach.

More particularly, this invention provides a duct jointing system which includes a plurality of elongate frame members, each frame member being a single piece of sheet metal folded to define a section which includes: (a) an open channel for receiving an edge portion of one wall of a sheet metal duct, the channel having a base against which the edge portion can abut, (b) a first web extending generally perpendicularly to said channel from a location adjacent the base of the channel, (c) an outer portion at the end of the first web which is remote from the channel, the outer portion extending in the same general direction as the channel, and (d) a second web extending obliquely toward the channel from a location adjacent the remote end of the first web. The single piece of sheet metal defining each frame member has an expanded portion constituting substantially the whole of the second web, and the system itself includes a plurality of corner pieces each having two ends angled to each other, with each end being insertable endwise into one end of one of the elongate frame members. Finally, the system includes means for securing together adjacent frame members on opposing duct ends.

GENERAL DESCRIPTION OF THE DRAWINGS

One embodiment of this invention is illustrated in the accompany drawings, in which like numerals denote like parts throughout the several views, and in which:

FIG. 1 is a perspective view of the duct jointing system of this invention;

FIG. 2 is a sectional view taken along the line 2—2 in FIG. 1;

FIG. 3 is an elevational view of a corner piece for use with the duct jointing system of this invention;

FIG. 4 is an edge view of the corner piece shown in FIG. 3;

FIGS. 5 and 6 are sectional views taken at the lines 5—5 and 6—6, respectively, in FIG. 3;

FIG. 7 is a plan view of a piece of sheet metal which has been slotted over only a portion of its surface;

FIG. 8 is a view of the piece shown in FIG. 7, after expansion of the slotted portion;

FIG. 9 is an elevational view of a variant of a corner piece for use with the duct jointing system of this invention; and FIG. 10 is an elevational view of two of the corner pieces according to FIG. 9, showing the interconnection.

DETAILED DESCRIPTION OF THE DRAWINGS

Attention is first directed to FIG. 1, which shows a duct jointing system generally at 8, which includes a plurality of elongate frame members 10, each frame member being a single piece of sheet metal folded to define a particular section which will be described in detail with respect to FIG. 2. Each frame member 10 is secured to the edge portion of a wall 12 of a sheet metal duct 14, the edge being received in a channel defined by the section of the frame member.

In the preferred embodiment, the duct jointing system includes a gasket member 17 adapted to provide a seal between adjacent frame members on opposing duct ends.

Also provided are corner pieces 19 each having two ends angled to each other, with each end being insertable endwise into one end of one of the elongate frame members 10.

Attention is now directed to FIG. 2, which shows the section at 2—2 in FIG. 1, being a section perpendicular to the main extent of one of the elongate frame members 10.

As seen in FIG. 2, the section includes (a) an open channel 20 for receiving an edge portion 22 of a wall 12 of a sheet metal duct 14, the channel having a base 24 against which the edge portion 22 can abut;

(b) a first web 26 extending generally perpendicularly to the channel 20 from a location adjacent the base 24 of the channel;

(c) an outer portion 28 at the end of the first web 26 which is remote from the channel 20, the outer portion 28 extending in the same general direction as the channel 20, namely to the right as seen in FIG. 2; and (d) a second web 30 which extends obliquely toward the channel 20 from a location adjacent the remote end of the first web 26.

More particularly, the section shown in FIG. 2 begins at an edge 32 and extends upwardly and leftwardly from the edge 32 to a bend location 33, from where it extends leftwardly to define the short leg of a J-shaped portion, the bottom of the J defining the base 24 of the channel 20, the longer leg of the J being provided by a panel 35 extending rightwardly from the base 24 and ending at a fold location 37, from which extends a further panel 39 leftwardly to a bend location 40. From the bend location 40, the second web 30 extends obliquely leftwardly and upwardly to a bend location 42, from whence a panel 44 extends rightwardly, thence enters a rounded portion 46, thence straightens at the top to provide an upper flat panel 48, which terminates at a bend location 50. From the bend location 50, the first web 26 extends downwardly through a dog leg bend 52 bounded by two obtuse-angled bend locations 53 and 55. The first web 26 then extends downwardly from the bend location 55 in a direction substantially perpendicular to the panel 35 and the channel 20, finally entering another dog leg portion 57 bounded by a upper bend location 59 and a lower bend location 60. From the lower bend location 60, the sheet metal piece extends downwardly and around the bottom of the shorter leg 34 of the J, undergoing a V-shaped bend where shown at 62, and finally terminating at an edge 64.

Contrary to what the person skilled in the art might expect with a duct jointing system of the kind disclosed, our tests have shown that the second web 30 between the bend location 40 and the bend location 42 is not in compression, but rather is in tension. Because of this, we have determined that it is possible to use expanded metal for the second web 30.

Additionally, we have found that it is possible to use expanded metal also in the outer portion 28 between the bend location 42 and the location 53. Finally, we have found that expanded metal can also be used in the panel 35 (the longer leg of the J-shaped portion defining the channel 20) at least over an intermediate portion thereof.

In FIG. 2, all of these parts which may be made of expanded metal have been cross-hatched. The remainder of the section has single hatching.

Attention is directed to FIG. 7 which shows a sample rectangle of sheet metal which has received slits 70 which are arranged in parallel, spaced-apart lines, and are staggered with respect to each other somewhat like bricks in a brick wall. In FIG. 8, the portion which has received the slits 70 has been been pulled apart along the direction shown by the arrows, and it will be seen that the portion with the slits 70 has expanded, whereas the other portion of course has not.

In the manufacture of the section shown in FIG. 2, the blank of sheet metal would first pass through an operation in which slits were provided along lines parallel to the bend lines 40, 42, etc., over those regions which were ultimately to provide the parts of expanded metal. Then, the blank would be stretched to expand the slit regions. If necessary, the sheet metal could then be rolled to flatten the expanded portions, since certain slit configurations can lead to rotation of the individual legs of the expanded portion. Finally, the expanded sheet metal piece would pass through a bending or forming operation in which it was given the section shown in FIG. 2. If desired, the piece of sheet metal can be in continuous form, continuously slit and expanded, and roll-formed into the section of FIG. 2 in a continuous way. These technologies are all conventional, and do not need to be described in detail here.

Looking at FIG. 2, the indented middle region of the first web 26 is adapted to receive the gasket 17, which projects slightly more than half way out of the recess, and into the recess of the adjoining piece. In the final assembly, the gasket 17 is under compression.

The corner pieces 19 are inserted into the openings at the ends of the elongate frame members as shown in FIG. 1, and these can be secured together as by bolts 72 cooperating with nuts 73.

Looking at FIG. 3, each corner piece 19 has two legs or ends 74 and 75 which are angled to each other. For a typical rectangular duct, the angle is a right angle.

At the junction between the legs 74 and 75, an aperture 76 is provided for the bolt 72.

Along the mid-lines of the legs 74 and 75 are provided channel regions or indentations parallel to the general extension of the respective end, the V-shaped indentation being inverted at an intermediate location, identified in FIG. 3 by the numeral 79. Thus, in the edge view of FIG. 4, the V-shaped indentation extends above the leg 74 at the numeral 80 and extends below the leg 74 at the numeral 82. A similar configuration is provided in the leg 75. FIGS. 5 and 6 show sections through different portions of the inverted V indentation.

It can be seen in FIG. 2 that the leg 74 is particularly shaped and adapted to fit snugly within the space defined between the first web 26, the second web 30, and the leftward end of the panel 35 adjacent the base 24 of the channel 20.

FIG. 1 shows the provision of means for securing together the adjacent frame members on opposing duct ends, and more particularly illustrates an elongated clip member 83 of C-shaped cross section, adapted to slide longitudinally over the adjacent outer portions 28 of juxtaposed frame members on corresponding edges of the ends of two ducts, holding the frame members resiliently together. Alternatively, the clip member 83 may be designed to simply snap over the adjacent outer portions 28 of the juxtaposed frame members.

Attention is now directed to FIGS. 9 and 10, which show a variant of the corner piece at 83. The variant 83 is similar to the corner piece shown in FIG. 3, except that it includes an outwardly projecting tab 85 projecting from an intermediate location on one of the legs 87.

In FIG. 10, two of the corner pieces 83 are shown juxtaposed in the same arrangement as they would be used in practice. In FIG. 10, the corner piece 83a has a tab 85a projecting from the upper leg 87a and folded through two right-angles to engage the upper leg 87b of the other corner piece 83b. Likewise, the vertical leg 89b of the corner piece 83b has a tab 90 which is folded through two right-angles to engage the vertical leg 89a of the corner piece 83a. Thus, each registering pair of legs is in engagement. With this provision, it is of course possible to also utilize a nut and bolt fastener through the corner aperture shown at 93 in FIG. 9. This corresponds to the aperture 76 in FIG. 3. However, the tab securement between the corner pieces will be sufficient to hold them together, and the nut and bolt fastener will not be absolutely essential.

While one embodiment of this invention has been illustrated in the accompanying drawings and described hereinabove, it will be apparent to those skilled in the art that changes and modifications may be made therein without departing from the essence of this invention as set forth in the appended claims.

The embodiments of the invention in which an exclusive property or privilege is claimed are defined as follows:

1. A duct jointing system comprising:
   a plurality of elongate frame members, each said frame member being a single piece of sheet metal folded to define a section which includes
   (a) an open channel for receiving an edge portion of one wall of a sheet metal duct, the channel having a base against which said edge portion can abut,
   (b) a first web extending generally perpendicularly to said channel from a location adjacent the base thereof,
   (c) an outer portion at the end of the first web which is remote from the channel, the outer portion extending in the same general direction as the channel, and
   (d) a second web extending obliquely toward the channel from a location adjacent said remote end of the first web;
   said single piece of sheet metal having an expanded portion constituting substantially the whole of said second web,
   a plurality of corner pieces each having two ends angled to each other, each end being insertable endwise into one end of one of the elongate frame members,
   and means for securing together adjacent frame members on opposing duct ends.

2. The invention claimed in claim 1, in which said expanded portion is expanded in the direction perpendicular to fold-lines defining the various webs and portions of the said section.

3. The invention claimed in claim 1, in which said open channel is defined in said section by a J-shaped portion having a longer leg and a shorter leg, the longer leg being intended to lie outside said edge portion of one wall of a sheet metal duct, the shorter leg being intended to lie inside said edge portion, said first web being contiguous with a perpendicularly bent portion lying against said shorter leg remote from said longer leg.

4. The invention claimed in claim 3, in which said single piece of sheet metal has a further expanded portion in said longer leg of said J-shaped portion.

5. The invention claimed in claim 3, in which said outer portion is U-shaped with the base of the U remote from the first web, one leg of the U merging with the first web and the other leg of the U merging with the second web.

6. The invention claimed in claim 5, in which the metal of the U-shaped outer portion is also expanded.

7. The invention claimed in claim 2, in which the expanded portion includes slits parallel to the fold lines defining the various webs and portions of said section.

8. The invention claimed in claim 4, in which the expanded portions include slits originally parallel to the fold lines defining the various webs and portions of said section, the slits being widened out in the expansion process.

9. The invention claimed in claim 6, in which the expanded portions include slits originally parallel to the fold lines defining the various webs and portions of said section, the slits being widened out in the expansion process.

10. The invention claimed in claim 1, in which each corner piece has, in each end, a V-shaped indentation parallel to the end, the indentations adding strength to said corner piece.

11. The invention claimed in claim 1, in which said first web defines a recess adapted to receive a gasket member for sealing purposes.

12. The invention claimed in claim 10, in which each V-shaped indentation has the V inverted at an intermediate location therealong.

13. The invention claimed in claim 1, in which the elongate frame members are four in number.

14. The invention claimed in claim 1, in which each corner piece has a tab extending from one end, the tab being adapted to be folded over the corresponding end of an adjacent corner piece in order to secure the corner pieces together.

15. The invention claimed in claim 12, in which each corner piece has a tab extending from one end, the tab being adapted to be folded over the corresponding end of an adjacent corner piece in order to secure the corner pieces together.

* * * * *